US008718557B2

(12) United States Patent
Wang

(10) Patent No.: US 8,718,557 B2
(45) Date of Patent: May 6, 2014

(54) BLUETOOTH FUNCTION PROVIDING METHOD AND TERMINAL FOR COMPUTER

(75) Inventor: Tao Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 169 days.

(21) Appl. No.: 13/391,784

(22) PCT Filed: Mar. 25, 2010

(86) PCT No.: PCT/CN2010/071293
§ 371 (c)(1),
(2), (4) Date: Mar. 14, 2012

(87) PCT Pub. No.: WO2011/022965
PCT Pub. Date: Mar. 3, 2011

(65) Prior Publication Data
US 2012/0190304 A1    Jul. 26, 2012

(30) Foreign Application Priority Data

Aug. 27, 2009    (CN) .......................... 2009 1 0090585

(51) Int. Cl.
*H04B 7/00*    (2006.01)
(52) U.S. Cl.
USPC ........................ 455/41.2; 455/423; 455/562.1
(58) Field of Classification Search
CPC ....... H04W 40/00; H04W 48/18; H04W 4/22; H04W 52/0274; H04W 56/00; H04W 74/06; H04W 76/007
USPC ...................................................... 455/41.2
See application file for complete search history.

(56) References Cited

U.S. PATENT DOCUMENTS

| 2005/0159148 A1* | 7/2005 | Habuka et al. ................ 455/423 |
| 2006/0025074 A1 | 2/2006 | Chen et al. |

FOREIGN PATENT DOCUMENTS

| CN | 1564476 A | 1/2005 |
| CN | 1937438 A | 3/2007 |
| CN | 101163296 A | 4/2008 |
| CN | 101232310 A | 7/2008 |
| CN | 101634976 A | 1/2010 |
| WO | 2004017575 A2 | 2/2004 |
| WO | WO 2006046015 A1 * | 5/2006 ............. H04L 12/56 |

OTHER PUBLICATIONS

International Search Report for PCT/CN2010/071293 dated Jun. 20, 2010.

* cited by examiner

*Primary Examiner* — Ajibola Akinyemi
(74) *Attorney, Agent, or Firm* — Ling Wu; Stephen Yang; Ling and Yang Intellectual Property

(57) ABSTRACT

A method for providing a Bluetooth function for a computer is disclosed, including: inputting a switch indication, and a terminal switching a working mode to a Bluetooth adapter mode; connecting the terminal to the computer via a universal serial bus (USB) interface; receiving an upload configuration parameter sent from the computer, and the terminal transmitting configuration parameters stored therein to the computer to enable the computer to regard the terminal as a Bluetooth adapter; the terminal sending an HCI command transmitted via the USB interface by the computer via its Bluetooth chip, converting a radio frequency signal received by its Bluetooth chip into an HCI event to transmit to the computer via the USB interface. Also disclosed in the present invention is a terminal for providing a Bluetooth function for a computer, including a user interface (UI), a switching module, a USB interface, an enumerating module and a Bluetooth module.

11 Claims, 2 Drawing Sheets

BLUETOOTH FUNCTION PROVIDING METHOD AND TERMINAL FOR COMPUTER

TECHNICAL FIELD

The present invention relates to the technical field of Bluetooth technology, and particularly to a method and terminal for providing a Bluetooth function for a computer.

BACKGROUND OF THE RELATED ART

Bluetooth is a short distance wireless communication technology which achieves information communication of point-to-point or point-to-multipoint connections by way of low bandwidth electric waves.

Currently, most of the middle-to-high end terminals have Bluetooth function, while the spreading of the Bluetooth technology in terminals enhances the application of the Bluetooth technology in other electronic devices as well, for example, most of the personal digital assistants (PDAs), laptop computers, etc. have Bluetooth function; however, there are still some electric devices having no Bluetooth chip integrated, with no Bluetooth function for themselves, and need to use Bluetooth adapter to provide Bluetooth function for themselves, for example, providing a Bluetooth function for a desktop computer by a Bluetooth adapter, but this may need user to purchase Bluetooth adapter, may increase the investment of the user in terms of fund and labor, and may influence the user experience.

SUMMARY OF THE INVENTION

In view of this, the main object of the present invention is to provide a method and terminal for providing a Bluetooth function for a computer without the need of a Bluetooth adapter to enable the provision of the Bluetooth function for the computer.

In order to achieve the above object, the technical solution of the present invention is achieved as follows:

a method for providing a Bluetooth function for a computer, in which a working mode of a terminal is switched to a Bluetooth adapter mode, the method further comprises:

after having received an upload configuration parameter command from the computer, the terminal transmitting configuration parameters stored therein to the computer so as to enumerate the terminal as a Bluetooth adapter; and the terminal sending an HCI command transmitted via a USB interface by the computer out via a Bluetooth chip thereof, and converting a radio frequency signal received by the Bluetooth chip thereof into an HCI event to send to the computer via the USB interface.

The terminal comprises a main control module on which an HCI protocol layer and a Bluetooth drive layer are provided;

before switching the working mode to the Bluetooth adapter mode, the method further comprises: providing a Bluetooth adaption task module on the terminal; and switching the working mode of the terminal to the Bluetooth adapter mode comprises: terminating a Bluetooth task of the terminal and establishing a connection between the Bluetooth drive layer and the Bluetooth adaption task module on the main control module.

An HCI module, an HCI protocol layer, a baseband module and a radio frequency module are provided on the Bluetooth chip; and an HCI module is also provided on the main control module;

the terminal sending out the HCI command transmitted via an USB interface by the computer via the Bluetooth chip thereof is specifically as follows:

the Bluetooth adaption task module acquires the HCI command transmitted by the computer via a USB interface module, and transmits the HCI command acquired thereby to the main control module;

the Bluetooth drive layer and the HCI module on the main control module send the HCI command transmitted from the Bluetooth adaption task module to the Bluetooth chip in the form of bit data; and the HCI module on the Bluetooth chip receives the bit data, and sends the bit data to the HCI protocol layer to parse the HCI command out, then the baseband module and the radio frequency module convert the parsed command into a radio frequency signal to send out.

Converting the radio frequency signal received by the Bluetooth chip thereof into the HCI event to send to the computer via USB interface is as follows:

the radio frequency module on the Bluetooth chip converts and packages the radio frequency signal received thereby into an HCI event via the baseband module and the HCI protocol layer, and sends the HCI event to the main control module in the form of bit data via the HCI module;

the HCI module on the main control module receives the bit data, delivers the received bit data to the Bluetooth drive layer to recover to the HCI event, and then to send to the Bluetooth adaption task module; and the Bluetooth adaption task module transmits the HCI event received thereby to the computer via the USB interface.

After converting the radio frequency signal received by the Bluetooth chip into the HCI event to send to the computer via USB interface, the method further comprises: the Bluetooth protocol stack acquiring the HCI event via the USB interface, converting the HCI event into a format which the Bluetooth application layer is able to recognize, and then sending to the Bluetooth application layer.

Said enumerating the terminal as a Bluetooth adapter is as follows:

the computer operates the Bluetooth application layer and the Bluetooth protocol stack in the operating system based on the configuration information sent from the terminal, and establishes a connection between the USB interface and the Bluetooth protocol stack; and the computer transmitting the HCI command via the USB interface comprises: the Bluetooth protocol stack packaging the command sent from the Bluetooth application layer into the HCI command to send to the terminal via the USB interface.

Also provided in the present invention is a terminal for providing a Bluetooth function for a computer, and the terminal comprises: a switching module, an enumerating module and a Bluetooth module, wherein the switching module is used for switching a working mode of the terminal to a Bluetooth adapter mode;

the enumerating module is used for receiving an upload configuration parameter command from the computer, and transmitting configuration parameters stored therein to the computer so as to enumerate the terminal as a Bluetooth adapter; and the Bluetooth module, including a Bluetooth chip, is used for sending out the HCI command transmitted via the USB interface by the computer via the Bluetooth chip thereof, converting a radio frequency signal received by the Bluetooth chip thereof into an HCI event, and sending the HCI event to the computer via the USB interface.

An HCI module, an HCI protocol layer, a baseband module and a radio frequency module are provided in the Bluetooth chip, wherein the HCI module is used for receiving the bit data transmitted by the main control module, sending the bit data to the HCI protocol layer to parse the HCI command out, then the baseband module and the radio frequency module converts the parsed command into a radio frequency signal to send out;

the radio frequency module converts and packages the radio frequency signal received thereby into an HCI event via the baseband module and the HCI protocol layer, and sends the HCI event to the main control module in the form of bit data via the HCI module;

the Bluetooth module further comprises: a Bluetooth adaption task module and a main control module, wherein the Bluetooth adaption task module is used for acquiring the HCI command from the USB interface of the terminal, transmitting the HCI command acquired thereby to the main control module, and sending to the computer via the USB interface the received HCI event transmitted by the main control module;

the main control module is provided with a Bluetooth drive layer and an HCI module, wherein the Bluetooth drive layer and the HCI module send the HCI command transmitted by the Bluetooth adaption task module to the Bluetooth chip in the form of bit data; the HCI module receives the bit data transmitted by the Bluetooth chip, sends the bit data received thereby to the Bluetooth drive layer to recover into the HCI event, and then sends to the Bluetooth adaption task module.

The switching module comprises: a task terminating module and a connection establishing module, wherein the task terminating module is used for terminating a Bluetooth task of the terminal; and the connection establishing module is used for establishing a connection between the Bluetooth drive layer on the main control module and the Bluetooth adaption task module.

It can be seen from the above technical solution provided in the present invention, in the present invention, a terminal having Bluetooth function is connected to a computer by means of a universal serial bus (USB) interface, and the terminal is enumerated as a Bluetooth adapter so as to provide the computer with the Bluetooth function by means of the Bluetooth chip of the terminal without the need of utilizing a Bluetooth adapter to provide the Bluetooth function for a computer, such that the investment of the user in terms of fund and labor will not be increased, and the user experience will not be influenced. The present invention also has following advantages and features:

as most of the operation systems have integrated with a general purpose Bluetooth protocol stack and Bluetooth application layer which will not need to be installed when using the Bluetooth function, in this way, the plug-and-play can be achieved without the need of adding additional hardware, such that the cost is relatively low.

PREFERRED EMBODIMENTS OF THE PRESENT INVENTION

Figure 1:
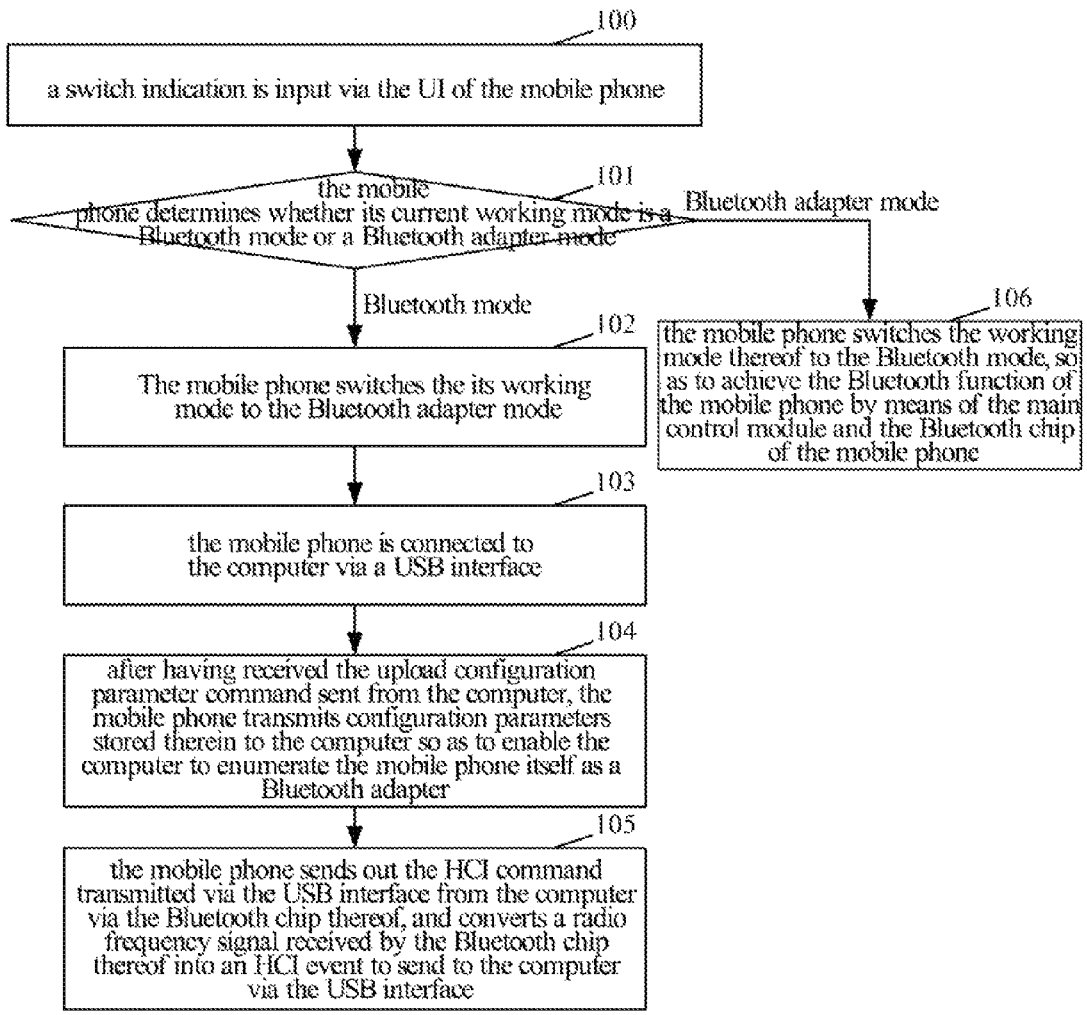
FIG. 1 is a flowchart of a method for providing a Bluetooth function for a computer according to the embodiments of the present invention.

FIG. 1 is a method for providing a Bluetooth function for a computer in accordance with an embodiment of the present invention, and in this embodiment, the terminal utilized is a mobile phone with Bluetooth function, including: a user interface (UI), a main control chip and a Bluetooth chip, wherein a Bluetooth application layer, a host control interface (HCI) protocol layer, a Bluetooth drive layer and an HCI module are provided on the main control chip, and an HCI module, an HCI protocol layer, a baseband module and a radio frequency module are provided on the Bluetooth chip; the HCI module includes an HCI and an HCI drive, which are in particular: a asynchronous receiver transmitter (UART) and a UART drive, secure digital input/output (SDIO) hardware and an SDIO drive, or a universal serial bus (USB) and a USB drive. As shown in FIG. 1, the Bluetooth adaption task module is first provided on the mobile phone, and the method can further include the following steps:

Step 100: a switch indication is input via the UI of the mobile phone.

Step 101 to step 102: the mobile phone determines whether its current working mode is a Bluetooth mode or a Bluetooth adapter mode, and if it currently operates in the Bluetooth mode, the mobile phone will switch its working mode to the Bluetooth adapter mode, and perform steps 103 to 105; and if it operates in the Bluetooth adapter mode, then it will perform step 106.

In this case, switching the working mode of the mobile phone to the Bluetooth adapter mode includes:

terminating a Bluetooth task of the terminal and establishing a connection between the Bluetooth drive layer on the main control module and the Bluetooth adaption task module.

Step 103: the mobile phone is connected onto the computer via a USB interface, wherein the USB interface includes a USB task and a USB drive.

This step further includes: the computer discovers the USB device and sends an upload configuration parameter command to the USB device, and in this embodiment, the USB device is the mobile phone.

Step 104: after having received the upload configuration parameter command sent from the computer, the mobile phone transmits configuration parameters stored therein to the computer so as to enumerate the mobile phone as a Bluetooth adapter, that is to say, the computer is enabled to recognize the mobile phone as a Bluetooth adapter.

In this case, the recognition of the mobile phone as a Bluetooth adapter by the computer specifically includes:

the computer operates the Bluetooth application layer and Bluetooth protocol stack in the operating system based on the configuration information sent from the mobile phone, and establish a connection between the USB interface and a Bluetooth protocol stack.

Step 105: the mobile phone sends out the HCI command transmitted via the USB interface from the computer via the Bluetooth chip thereof, and converts a radio frequency signal received by the Bluetooth chip thereof into an HCI event to send to the computer via the USB interface, so as to provide a Bluetooth function for the computer.

In this step, the mobile phone sending out the HCI command transmitted via the USB interface from the computer via the Bluetooth chip thereof specifically includes: the Bluetooth adaption task module acquiring the HCI command transmitted via the USB interface from the computer, and transmitting the HCI command acquired thereby to the main control module; the Bluetooth drive layer and the HCI module on the main control module sending to the Bluetooth chip the HCI command transmitted from the Bluetooth adaption task module in the form of bit data; the HCI module on the Bluetooth chip receiving the bit data, sending the bit data to the HCI protocol layer to parse the HCI command out, then the baseband module and the radio frequency module converting the parsed the command into a radio frequency signal. In this case, the computer transmitting the HCI command via the USB interface is as follows: the Bluetooth protocol stack packaging the command sent from the Bluetooth application layer into an HCI command, and sending to the mobile phone via the USB interface.

In this step, converting the radio frequency signal received by the Bluetooth chip thereof into the HCI event to send to the computer via USB interface is specifically as follows:

the radio frequency module on the Bluetooth chip converts and packages the radio frequency signal received thereby into an HCI event via the baseband module and HCI protocol layer, and sends the HCI event in the form of bit data to the main control module via the HCI module; the HCI module on the main control module receives the bit data, sends the received bit data to the Bluetooth drive layer to recover to the HCI event, and sends to the Bluetooth adaption task module; and the Bluetooth adaption task module transmits the HCI event received thereby to the computer via the USB interface.

In step 105, after converting the radio frequency signal received by the Bluetooth chip thereof into the HCI event to send to the computer via the USB interface, this step further includes:

the Bluetooth protocol stack acquiring the HCI event via the USB interface, converting the HCI event into a format which can be recognized by the Bluetooth application layer, and then sending to the Bluetooth application layer.

Step 106: The mobile phone switches the working mode thereof to the Bluetooth mode, so as to achieve the Bluetooth function of the mobile phone by means of the main control module and the Bluetooth chip of the mobile phone.

This step specifically includes: disconnecting the connection between the Bluetooth drive layer of the main control module and the Bluetooth adaption task module, starting up the Bluetooth task of the terminal; the main control module and the Bluetooth chip achieving the Bluetooth function.

Figure 2:
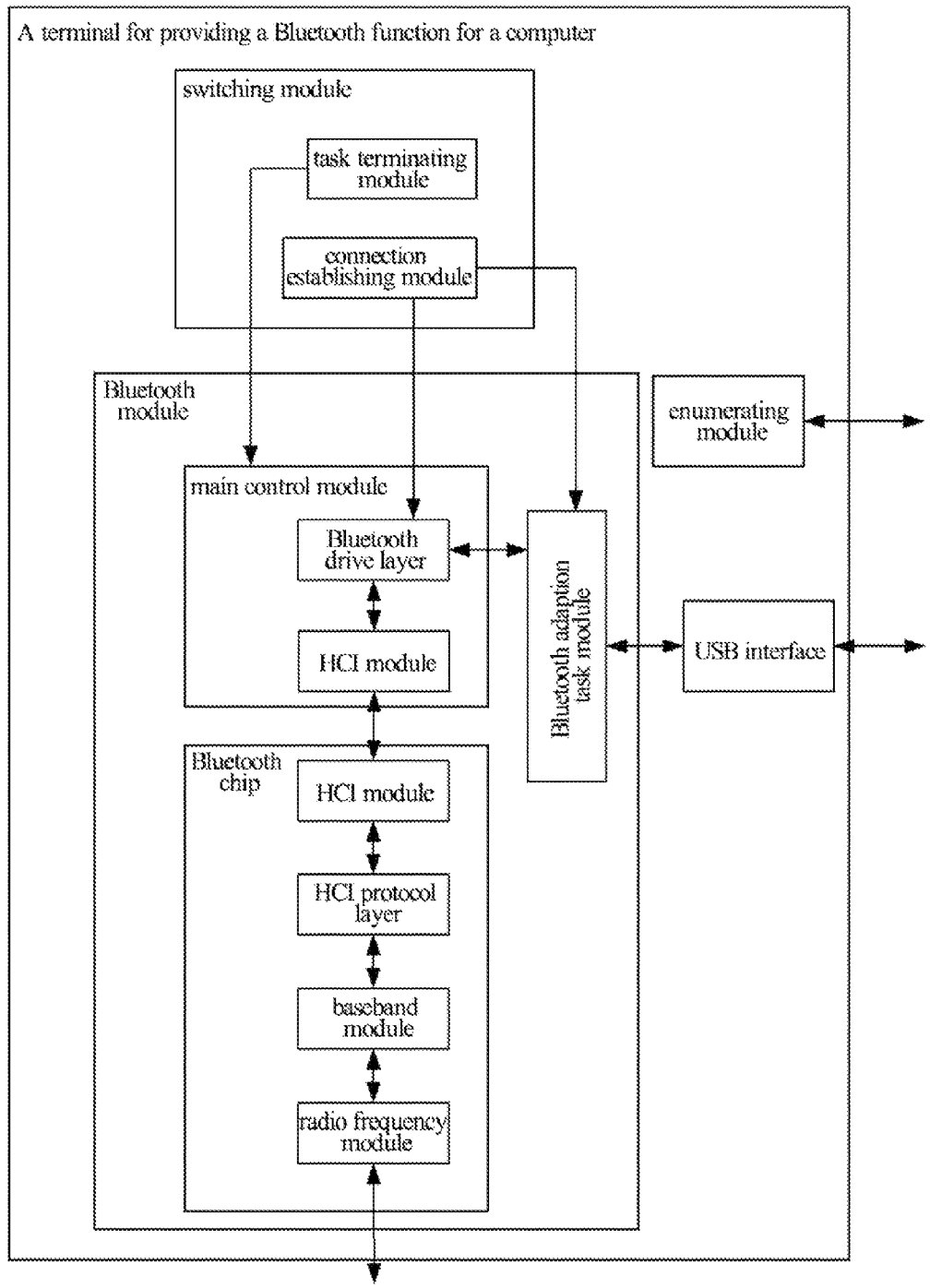
FIG. 2 is a structural schematic diagram of a terminal for providing a Bluetooth function for a computer according to the embodiments of the present invention.

FIG. 2 is a structural schematic diagram of a terminal for providing a Bluetooth function for a computer according to an embodiment of the present invention, and as shown in FIG. 2, it includes: a switching module, an enumerating module and a Bluetooth module, wherein the switching module is used for switching a working mode of the terminal to a Bluetooth adapter mode;

the enumerating module is used for receiving an upload configuration parameter command from the computer, and transmitting configuration parameters stored therein to the computer so as to enumerate the terminal as a Bluetooth adapter; and the Bluetooth module, including a Bluetooth chip, is used for sending out an HCI command transmitted via the USB interface from the computer via the Bluetooth chip thereof, converting a radio frequency signal received by the Bluetooth chip thereof into an HCI event, and then sending to the computer via the USB interface.

In this case, the Bluetooth chip is provided with an HCI module, an HCI protocol layer, a baseband module and a radio frequency module, wherein the HCI module receives the bit data transmitted from the main control module, and sends the bit data to the HCI protocol layer to parse the HCI command out, then the baseband module and the radio frequency module convert the parsed command into a radio frequency signal to send out; the radio frequency module converts and packages the radio frequency signal received thereby into an HCI event via the baseband module and HCI protocol layer, and the HCI module sends the HCI event to the main control module in the form of bit data;

the Bluetooth module further includes: a Bluetooth adaption task module and a main control module, wherein the Bluetooth adaption task module is used for acquiring the HCI command transmitted via the USB interface from the computer, transmitting the HCI command acquired thereby to the main control module, and sending the received HCI event transmitted from the main control module to the computer via the USB interface; and the main control module is provided with a Bluetooth drive layer and an HCI module, wherein the Bluetooth drive layer and the HCI module send to the Bluetooth chip the HCI command transmitted from the Bluetooth adaption task module in the form of bit data; the HCI module receives the bit data transmitted from the Bluetooth chip, sends the received bit data to the Bluetooth adaption task module to recover to an HCI event, and then sends to the Bluetooth drive layer.

Furthermore, the switching module includes: a task terminating module and a connection establishing module, wherein the task terminating module is used for terminating a Bluetooth task of the terminal; and the connection establishing module is used for establishing a connection between the Bluetooth drive layer on the main control module and the Bluetooth adaption task module.

What is described above is merely preferred embodiments of the present invention and is not intended to limit the scope of protection of the present invention.

What is claimed is:

1. A method for providing a Bluetooth function for a computer, comprising;
   switching a working mode of a terminal to a Bluetooth adapter mode;
   after having received an upload configuration parameter command from the computer, the terminal transmitting configuration parameters stored therein to the computer so as to enumerate the terminal as a Bluetooth adapter; and
   the terminal sending out a host control interface (HCI) command transmitted via a USB interface from the computer via a Bluetooth chip thereof, and converting a radio frequency signal received by the Bluetooth chip thereof into an HCI event to send to the computer via the USB interface;
   wherein the terminal comprises a main control module on which an HCI protocol layer and a Bluetooth drive layer are provided;
   before said switching the working mode to the Bluetooth adapter mode, the method further comprises: providing a Bluetooth adaption task module on the terminal; and
   said switching the working mode of the terminal to the Bluetooth adapter mode comprises: terminating a Bluetooth task of the terminal and establishing a connection between the Bluetooth drive layer on the main control module and the Bluetooth adaption task module.

2. The method according to claim 1, wherein an HCI module, an HCI protocol layer, a baseband module and a radio frequency module are provided on the Bluetooth chip; and an HCI module is also provided on the main control module;
   the terminal sending out the HCI command transmitted via the USB interface from the computer via the Bluetooth chip thereof is specifically as follows:
   the Bluetooth adaption task module acquires the HCI command transmitted from the computer via a USB interface module, and transmits the acquired HCI command to the main control module;
   the Bluetooth drive layer on the main control module and the HCI module send to the Bluetooth chip the HCI command transmitted from the Bluetooth adaption task module in a form of bit data; and the HCI module on the Bluetooth chip receives the bit data, and sends the bit data to the HCI protocol layer to parse the HCI command out, then the baseband module and the radio frequency module convert the parsed command into a radio frequency signal to send out.

3. The method according to claim 2, wherein said enumerating the terminal as a Bluetooth adapter is as follows:

the computer operates the Bluetooth application layer and the Bluetooth protocol stack in an operating system based on configuration information from the terminal, and establishes a connection between the USB interface and the Bluetooth protocol stack; and the computer transmitting the HCI command via the USB interface comprises: the Bluetooth protocol stack packaging the command sent from the Bluetooth application layer into the HCI command to send to the terminal via the USB interface.

4. The method according to claim 1, wherein said converting the radio frequency signal received by the Bluetooth chip thereof into the HCI event to send to the computer via the USB interface is as follows:

the radio frequency module on the Bluetooth chip converts and packages the received radio frequency signal into an HCI event via the baseband module and the HCI protocol layer, and sends the HCI event to the main control module in the form of bit data via the HCI module;

the HCI module on the main control module receives the bit data, sends the received bit data to the Bluetooth drive layer to recover to the HCI event, then sends the HCI event to the Bluetooth adaption task module; and the Bluetooth adaption task module transmits the received HCI event to the computer via the USB interface.

5. The method according to claim 4, wherein after said converting the radio frequency signal received by the Bluetooth chip thereof into the HCI event to send to the computer via USB interface, the method further comprises: a Bluetooth protocol stack acquiring the HCI event via the USB interface, converting the HCI event into a format which can be recognized by a Bluetooth application layer to send to the Bluetooth application layer.

6. The method according to claim 5, wherein said enumerating the terminal as a Bluetooth adapter is as follows:

the computer operates the Bluetooth application layer and the Bluetooth protocol stack in an operating system based on configuration information from the terminal, and establishes a connection between the USB interface and the Bluetooth protocol stack; and the computer transmitting the HCI command via the USB interface comprises: the Bluetooth protocol stack packaging the command sent from the Bluetooth application layer into the HCI command to send to the terminal via the USB interface.

7. The method according to claim 4, wherein said enumerating the terminal as a Bluetooth adapter is as follows:

the computer operates the Bluetooth application layer and the Bluetooth protocol stack in an operating system based on configuration information from the terminal, and establishes a connection between the USB interface and the Bluetooth protocol stack; and the computer transmitting the HCI command via the USB interface comprises: the Bluetooth protocol stack packaging the command sent from the Bluetooth application layer into the HCI command to send to the terminal via the USB interface.

8. The method according to claim 1, wherein said enumerating the terminal as a Bluetooth adapter is as follows:

the computer operates the Bluetooth application layer and the Bluetooth protocol stack in an operating system based on configuration information from the terminal, and establishes a connection between the USB interface and the Bluetooth protocol stack; and the computer transmitting the HCI command via the USB interface comprises: the Bluetooth protocol stack packaging the command sent from the Bluetooth application layer into the HCI command to send to the terminal via the USB interface.

9. A terminal for providing a Bluetooth function for a computer, comprising: a switching module, an enumerating module and a Bluetooth module, wherein the switching module is used for switching a working mode of the terminal to a Bluetooth adapter mode;

the enumerating module is used for receiving an upload configuration parameter command sent from the computer, and transmitting configuration parameters stored therein to the computer to enumerate the terminal as a Bluetooth adapter; and the Bluetooth module, including a main control module, a Bluetooth chip and a Bluetooth adaption task module, is used for sending out an HCI command transmitted via a USB interface from the computer via a Bluetooth chip thereof, converting a radio frequency signal received by the Bluetooth chip thereof into an HCI event to send to the computer via the USB interface;

wherein the switching module comprises: a task terminating module and a connection establishing module, and the main control module is provided with a Bluetooth drive layer and an HCI module, wherein the task terminating module is used for terminating a Bluetooth task of the terminal; and the connection establishing module is used for establishing a connection between the Bluetooth drive layer of the main control module and the Bluetooth adaption task module.

10. The terminal according to claim 9, wherein an HCI module, an HCI protocol layer, a baseband module and a radio frequency module are provided in the Bluetooth chip, wherein the HCI module is used for receiving bit data transmitted from a main control module, and sending the bit data to the HCI protocol layer to parse the HCI command out, then the baseband module and the radio frequency module convert the parsed command into a radio frequency signal to send out; and the radio frequency module converts and packages the received radio frequency signal into an HCI event via the baseband module and the HCI protocol layer, and sends the HCI event to the main control module in a form of bit data via the HCI module.

11. The terminal according to claim 10, wherein the Bluetooth adaption task module is used for acquiring the HCI command from the USB interface of the terminal, transmitting the acquired HCI command to the main control module, and sending received HCI event transmitted from the main control module to the computer via the USB interface; and the Bluetooth drive layer and the HCI module are used for sending the HCI command transmitted from the Bluetooth adaption task module to the Bluetooth chip in the form of bit data; and the HCI module is further used for receiving the bit data transmitted from the Bluetooth chip, sending the received bit data to the Bluetooth drive layer to recover to an HCI event, and then sending the HCI event to the Bluetooth adaption task module.

* * * * *